United States Patent
Holder

[19]

[11] Patent Number: 6,155,002
[45] Date of Patent: Dec. 5, 2000

[54] SANITARY FOLDING PAPER BUG CATCHER

[76] Inventor: Billy G. Holder, 2701 Melvina St., Canon City, Colo. 81212

[21] Appl. No.: 09/010,781

[22] Filed: Jan. 22, 1998

[51] Int. Cl.[7] ................................................. A01M 1/14
[52] U.S. Cl. .............................................................. 43/115
[58] Field of Search ................................. 43/114, 115, 117, 43/136

[56] References Cited

U.S. PATENT DOCUMENTS

| 5,253,448 | 10/1993 | Byom | 43/114 |
| 5,303,501 | 4/1994 | Seemann | 43/114 |
| 5,383,301 | 1/1995 | Babb | 43/114 |
| 5,384,981 | 1/1995 | Cohen | 43/114 |
| 5,634,293 | 6/1997 | Mike et al. | 43/136 |
| 5,815,981 | 10/1998 | Dowling et al. | 43/114 |

Primary Examiner—Thomas Price
Attorney, Agent, or Firm—Thomas W. Hanson

[57] ABSTRACT

A folding insect trap which uses an adhesive layer on only the inner side, leaving the outer surface clean and available for handling. A decorative, or camouflage, pattern is printed on the outer surface to disguise the appearance of the trap. A pattern may also be printed on the inner surface to aid in attracting insects. The colors of the two patterns may be modified to attract individual, or several, target insects. The design of the trap is such that manufacturing waste is minimized and packaging is reduced. The trap may be extracted from the package, set in place, used, and disposed of without coming into contact with the adhesive. Alternate forms provide tabs for easier opening of the trap; provide an elongated, pointed form for insertion into the soil around a plant; incorporate a stick for insertion into the soil; and incorporate a chemiluminescense stick for attracting insects.

2 Claims, 8 Drawing Sheets

SANITARY FOLDING PAPER BUG CATCHER

FIELD OF THE INVENTION

This invention relates to the field of insect traps and more particularly to insect traps which utilize an adhesive to capture the insect.

BACKGROUND OF THE INVENTION

It is well known that insects are a nuisance both indoors and out. They may also be a health risk. They can especially be a problem where potted plants are displayed indoors. Often, insects or eggs will be brought into the house with a new plant or in potting soil for an existing plant.

Many methods of eliminating insects have been developed. Electric "bug zappers" are among the most recent approaches and include the use of light to attract the insects. Fly paper and other adhesive traps, such as rigid strips, are a more traditional solution. The adhesive traps offer the advantages of not requiring power and they can be placed almost anywhere. However, most of the adhesive traps are coated with adhesive on all sides. While maximizing the area available for trapping insects, this feature makes them messy to handle and difficult to dispose of without touching the dead insects which are stuck to the trap. Further, the traps must be suspended when in use to prevent them from sticking to a supporting surface. These suspended traps may become entangled in plants, curtains, and even the hair of passers-by. A side effect of this is that a relatively large space must be set aside around the trap, which limits the areas in which the trap can be deployed. This approach is almost universal, however, because of the large the surface area available for trapping insects.

Another drawback to the existing adhesive traps is that they are unattractive. Adhesive coated on all sides, and often colored bright yellow, they are obviously insect traps even when new. This may carry an undesired stigma because they imply that the house has a "bug problem." The appearance and impact worsens as they become coated with dead insects which are trapped.

There is a need for small, compact adhesive insect trap which is attractive and can be deployed without hanging. Ideally, the trap would be self standing while offering the option of hanging. In appearance it should not obviously be an insect trap. Insects captured by the trap should be hidden from view from a range of viewing directions. It should be possible to remove the trap from its package and set it up without contacting the adhesive. After the trap is full, or no longer needed, it should be possible to pick up the trap and dispose of it without coming into contact with either the adhesive or the trapped insects. Further, the trap should require minimal packaging as sold and should be inexpensive to make and generate minimal waste during manufacture.

SUMMARY OF THE INVENTION

The present invention is an insect trap formed from a rectangular sheet of stiff material, such as paper or plastic which has been folded along a vertical line so that it stands upright with no other support. The inner surface is coated with an adhesive, and the outer surface is imprinted with a design. The trap is pleasant in appearance and hides the trapped insects from view. The trap can be taken from its package, set up, used, and disposed of without coming into contact with the adhesive or the trapped insects. The trap can be folded in half for packaging, presenting the imprinted pattern for viewing and protecting the adhesive layers from exposure to the air. This simplifies packaging as a simple, clear clamshell package can be used, and no additional backing sheet is needed.

A further embodiment of the invention provides a V-shaped notch which allows the trap to be hung from the horizontal bar of a lampshade, or similar rod. This allows placement of the trap near an existing light source, likely to attract insects, and hidden from view by the lampshade.

Further embodiments of the invention use a pattern imprinted on the inner surface of the trap to attract insects. One or more colors can be used to attract a single type of insect or more than one type.

A still further embodiment provides straps which allow the trap to be attached to a stick, or rod, which can then be inserted into the soil adjacent to a plant. The straps can also be used to hold a chemical luminescent light stick which will also attract insects. The color of the light stick can be selected to be attractive to different insects.

Yet a further embodiment of the invention provides tabs and insets in the edges of the trap to make it easier to grasp the edges of the trap to open it. The tabs and inset on the opposite sides are aligned in such a way that two traps can be cut from adjacent positions in a sheet of material with a single cut, leaving no waste behind.

The above and other features and advantages of the present invention will become more clear from the detailed description of a specific illustrative embodiment thereof, presented below in conjunction with the accompanying drawings.

DESCRIPTION OF THE PREFERRED EMBODIMENT(S)

The disclosed invention is an adhesive insect trap which seeks to optimize several goals. It is aesthetically pleasing to look at, it can be set up and disposed of without contacting either the adhesive or the dead insects, it is simple to manufacture and to package, it requires very little raw material to manufacture, and it generates very little waste either in manufacturing or in packaging. The following discussion focuses on the preferred embodiment of the invention, in which insect patterns are printed on the outside of a folded paper form with adhesive on the inner surface. However, as will be recognized by those skilled in the art, the apparatus can be made from a variety of materials and using other techniques which are within the scope of the invention.

The following is a brief glossary of terms used herein. The supplied definitions are applicable throughout this specification and the claims unless the term is clearly used in another manner.

Finger Tabs—tabs located on the edges of the invention to simplify opening. In the preferred embodiment, the tabs are paired with notches, or insets, on the opposite edge to increase the area available for gripping.

Inside, outside—where the invention is folded, inside, or inner, refers to that surface on the interior of the fold angle, where there is less that 180 degrees between the planes. Outside, or outer, is the surface on the exterior of the angle.

The disclosed invention is described below with reference to the accompanying figures in which like reference numbers designate like parts.

PREFERRED EMBODIMENT

Figure 1:
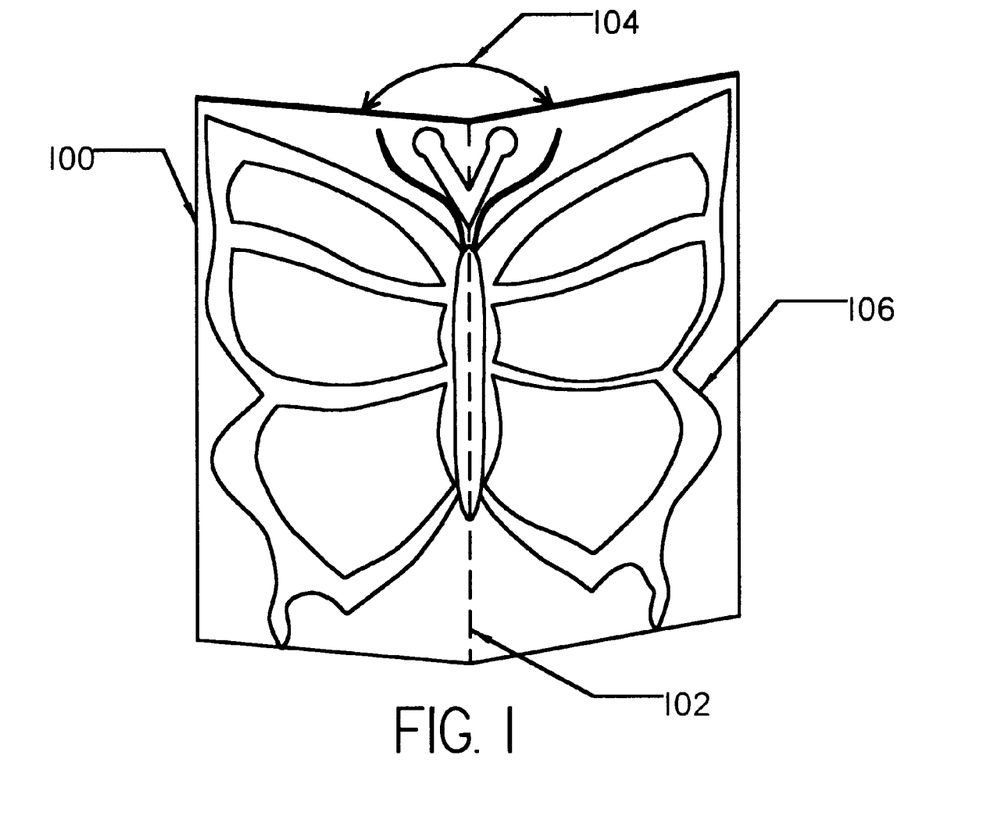
FIG. 1 provides a perspective view of the invention set up for use.

The basic structure of the invention, 100, can be seen in FIG. 1. A single sheet of relatively stiff material is formed with a vertical fold, 102, along the center of the sheet. The angle, 104, can vary significantly, from 45 degrees or less to almost 180 degrees. It is anticipated that a typical angle will be in the range of 120 to 140 degrees. The folded sheet can then stand unsupported on a flat surface, such as a windowsill or table. This provides a great deal of flexibility to place the trap near plants or other havens for insects. The outer surface is free of adhesive providing several advantages: it provides a convenient surface for handling the trap; it reduces the chance that it will inadvertently become attached to an adjacent item, such as a curtain or a plant; and it avoids unsightly dead insects on the most visible surface. The outer surface of the trap would be printed with an aesthetically pleasing pattern or logo, 106. In the preferred embodiment this is an insect, such as a butterfly, which is pleasantly associated with plants, or an insect catcher such as a frog or lizard. Alternatively, a camouflaging pattern could be used to help the trap to visually blend into its surroundings. Where the trap is used away from plants, a color scheme which matches the surrounding decor could be used.

A variety of materials are appropriate for the body of the trap. The material should be sufficiently stiff so that the trap is self supporting, it should be readily printable by commercially available methods, and it should not be adversely effected by the adhesive. In the preferred embodiment, heavy paper stock has been found to perform adequately. Plastic sheet or a laminate of paper and plastic provides improved performance at a slightly increased cost and offers the advantage of water resistance, which can be important if the trap is place in or near a plant which is watered regularly. Transparent plastic allows a pattern to be printed on only one side while being visible from both, and visually eliminates the border area around the pattern while it is still physically present.

Figures 2, 3, 4:
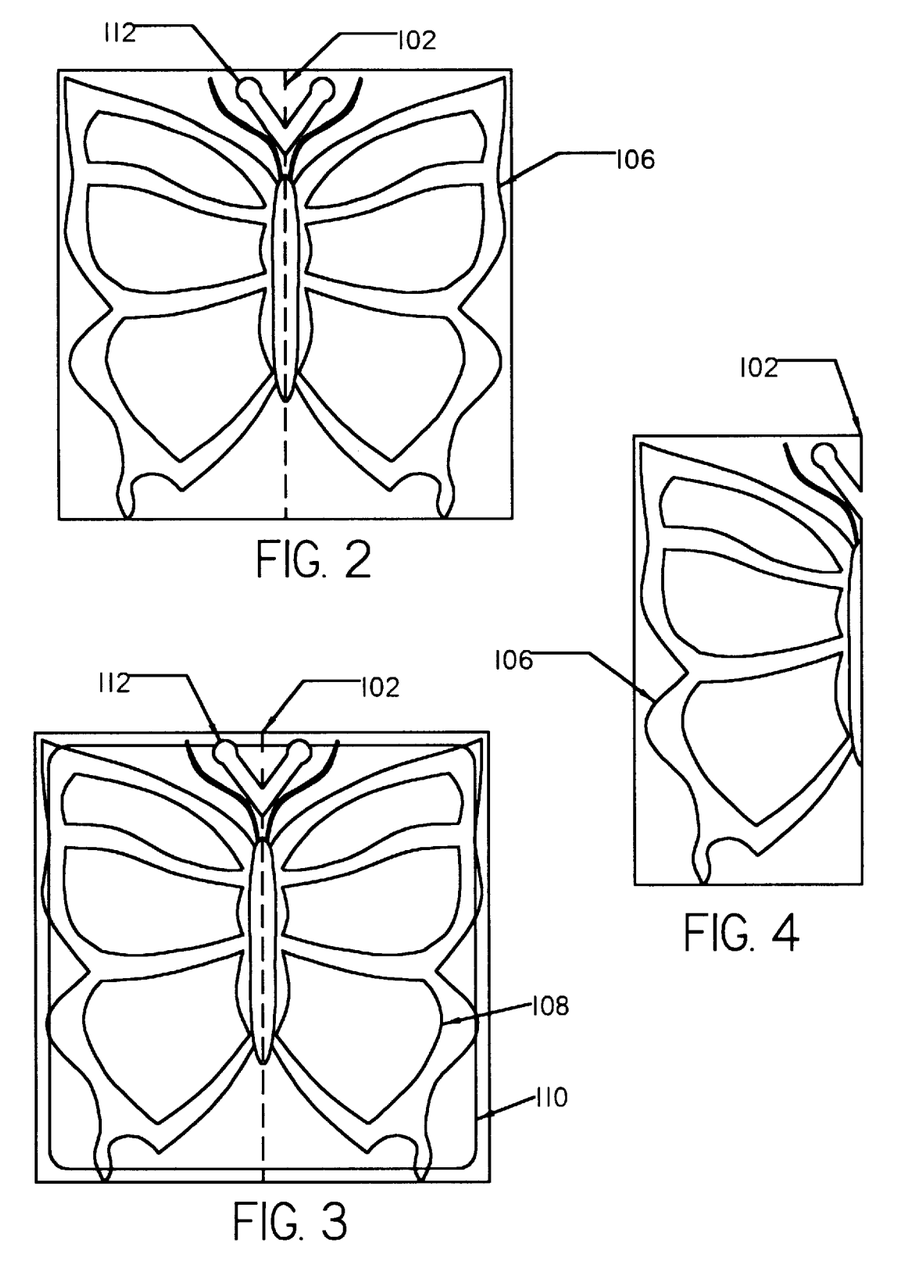
FIG. 2 shows the outer face of the invention when fully unfolded.
FIG. 3 provides a view of the inner face of the invention showing the adhesive layer and the optional pattern.
FIG. 4 shows the invention as folded along the centerline, displaying one-half of the outer pattern.

The outer surface is shown in more detail in FIG. 2 where the trap has been folded out flat. Various alternatives exist for the color scheme for the pattern, 106. A first option is to use the colors appropriate for the subject, such as the proper colorings for a specific butterfly. This will maximize the aesthetic impact of the design. A second option is to use colors which attract the type of insect targeted by the trap. Such use of colors is well known, being most evident in the use of yellow on existing adhesive taps. However, since it is aesthetically undesirable to have insects on the outer surface, a third option would be to select a color which either repels insects, or is neutral to them. In combination with an attractive color in the inner surface, this leads to a concentration of insects on the inner surface of the trap. V-notch, 112, is intended to allow the trap to be hung from a horizontal rod such as is found in a lamp shade, radiating outward from the center to the circumference of the shade. This provides a convenient method of positioning the trap near an existing light source. This positioning has an additional advantage in that the trap is hidden from view by the lampshade. The notch could also be used to hang the trap from a string, or similar, as a positioning alternative.

FIG. 3 illustrates the inner surface in more detail. An adhesive layer, 110, is spread evenly over most or all of the inner surface. Leaving a small gap at the edges which is free of adhesive reduces the chance that the user will make contact with the adhesive as the trap is opened. Several adhesives are commercially available for this purpose, or can be developed. The essential characteristics are sufficient strength to hold a struggling insect, resistance to surface filming or drying to retain the adhesive quality, and high tack to capture insects at the lightest contact. A pattern, 108, may also be printed in the inner surface. This may be the same as that on the outer surface or it may be different. The pattern may also be eliminated, or may be replaced by a solid block of color attractive to the target insect. Alternatively, the adhesive may be colored to provide the attraction. Where a pattern or printed color is used, the adhesive layer should be translucent or transparent to make the pattern, or color, visible. The primary consideration of the inner surface pattern is the attraction of insects so that they will make contact with the adhesive. A secondary consideration is aesthetics, as the inner side will be hidden in most circumstances. Color selection also focuses on attracting insects. One or more colors will be selected that are known to attract the target insect. A combination of colors, each attractive to a different insect, may also be used.

FIG. 4 illustrates the trap folded along the centerline, 102. In this configuration, the adhesive layer is to the inside, and the trap may be easily handled without coming into contact with the adhesive or with any trapped insects. This configuration can be used for packaging the trap, as discussed below, and for disposing of the trap.

Figure 5:
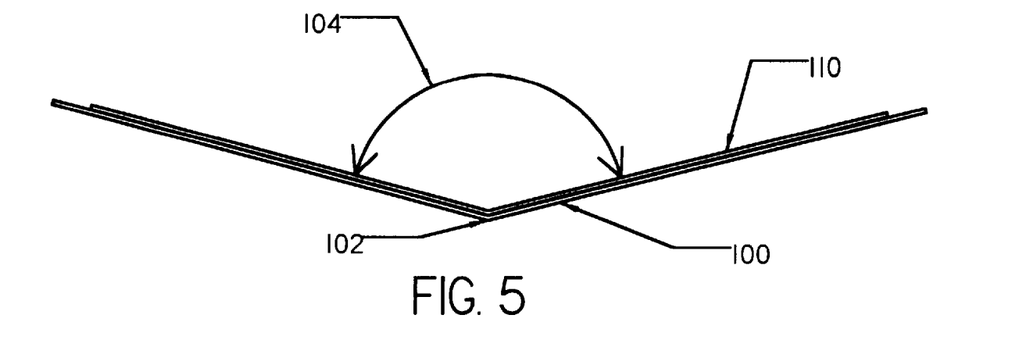
FIG. 5 shows a top view of the invention set up for use.

FIG. 5 provides a top view of the trap, 100, configured for use. The angle, 104, between the two sides can be varied by the end user as desired to maximize the presentation of the pattern on the outer surface, minimize the apparent size of the trap, or to adjust the stability of the trap. Obtuse angles close to 180 degrees will maximize the visibility of the outer surface, acute angles close to 0 degrees will minimize the profile of the trap, and angles close to 90 degrees will be more stable. As discussed above, the adhesive layer, 110, is applied only to the inner surface of the trap.

Figure 6:
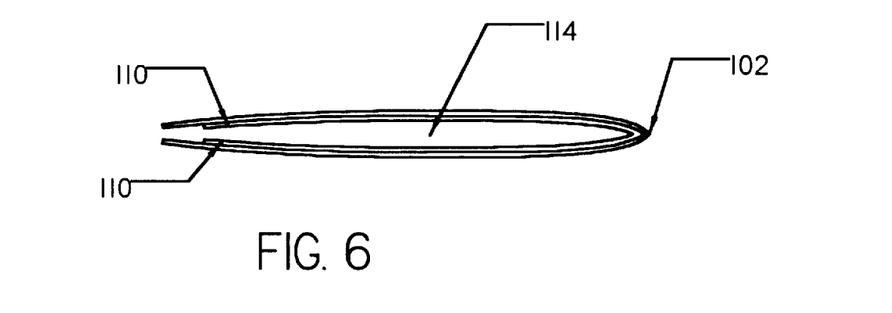
FIG. 6 shows an end view of the invention in its folded position with the adhesive on the inside.

As shown in FIG. 6, when the trap, 100, is folded along the center line, 102, the adhesive layer, 110, is fully contained within the trap, along with any trapped insects. Where this position is used for packaging the trap for sale, the two sides would be pressed closely together, eliminating the gap, 114. The opposing faces of the adhesive will temporarily bond to each other, retaining the trap in a closed position and preventing exposure of the adhesive to the air, extending the shelf life of the trap without the need for a separate backing sheet.

Figure 7:
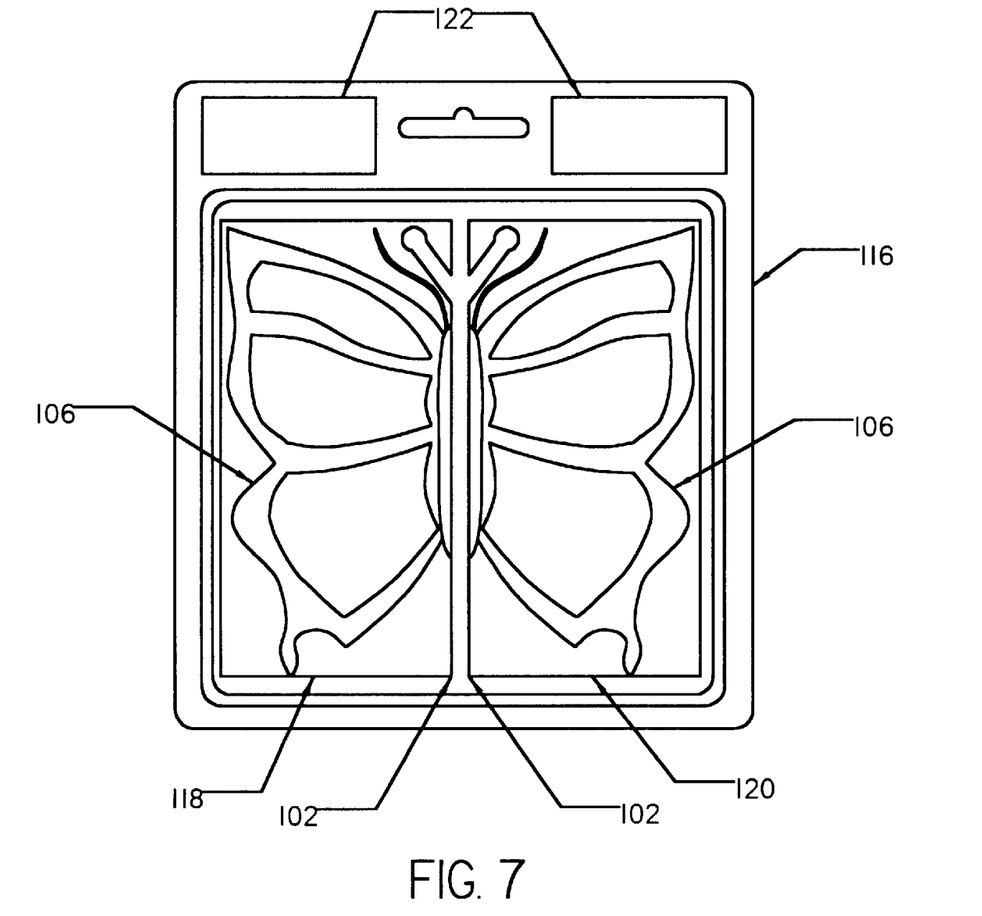
FIG. 7 illustrates a packaging option for the invention with two folded units arranged to display the full pattern.

FIG. 7 illustrates one packaging option for the disclosed invention which takes advantage of its design. A pair of traps, 118 and 120, are folded in half as illustrated in FIGS. 4 and 6, and inserted into a clear plastic "clamshell" container, 116 with their center folds, 102, adjacent. Several pair of the traps can be stacked within a single clamshell. The number of traps and the capacity of the clamshell can be adjusted to meet a particular cost point or quantity. This configuration allows the complete outer surface pattern to be displayed even though the individual traps are folded. The same pattern is visible from both the front and the back of the package which makes them easy and attractive to display. Alternatively, two different patterns can be packaged together, with one visible on each side of the package. As traps are removed from the package for use, the pattern remains visible until all traps have been removed form one side. A simple label, or pair of labels, 122, can be added to the top tab of the clamshell to contain trademarks, information, UPC codes, etc. as needed. Because each trap folds on itself to seal the opposing faces of the adhesive against each other, a separate backing sheet is not needed to keep air from the adhesive layers.

An alternative packaging configuration is also available. The traps may be packaged in their flat configuration with the adhesive surface of two adjacent traps in contact. Thus, the adhesive layers are sealed by the paired trap, again eliminating the need for a separate backing sheet. This arrangement is advantageous where a significantly stiff material is used. Some materials may try to return to their original flat position after folding. This will tend to open the trap, creating gap, 114 in FIG. 6, and allowing air to come into contact with the adhesive. By packaging the traps in a flat position, this problem is avoided. However, this configuration essentially requires that two traps be removed from the package and put into use at the same time, to avoid contact between the adhesive of the trap left in the package with the outer surface of an adjacent trap or with the package. Where the traps are packaged in their folded position, they can be removed individually with no adverse consequences.

Use Scenario

A brief scenario of how the invention could be used will further illustrate the features and benefits of the invention.

When an insect trap is needed, the package is opened and a single trap is extracted, still in its folded position. Grasping the two edges, the trap is opened and unfolded to the desired angle. It is then position in the area where needed and arranged so that the outer surface faces the direction from which the trap will be most commonly viewed. Where there is a wide viewing angle, the trap is closed slightly, increasing the masking effect whereby the inner surface of the trap is hidden by the outer surface. Over a period of time, insects are attracted to the pattern printed on the trap and, when they come into contact with the inner adhesive covered surface, are captured. Since this surface faces away from the viewing area, the dead and dying bugs are hidden from view. When the trap is full, or no longer needed, it is grasped by its outer surface and pinched shut, enclosing the insects, and then disposed of. At no time during the life cycle of the trap is it necessary for the user to come into contact with either the adhesive or the insects adhered to the trap.

Alternative Embodiments

Figure 8:
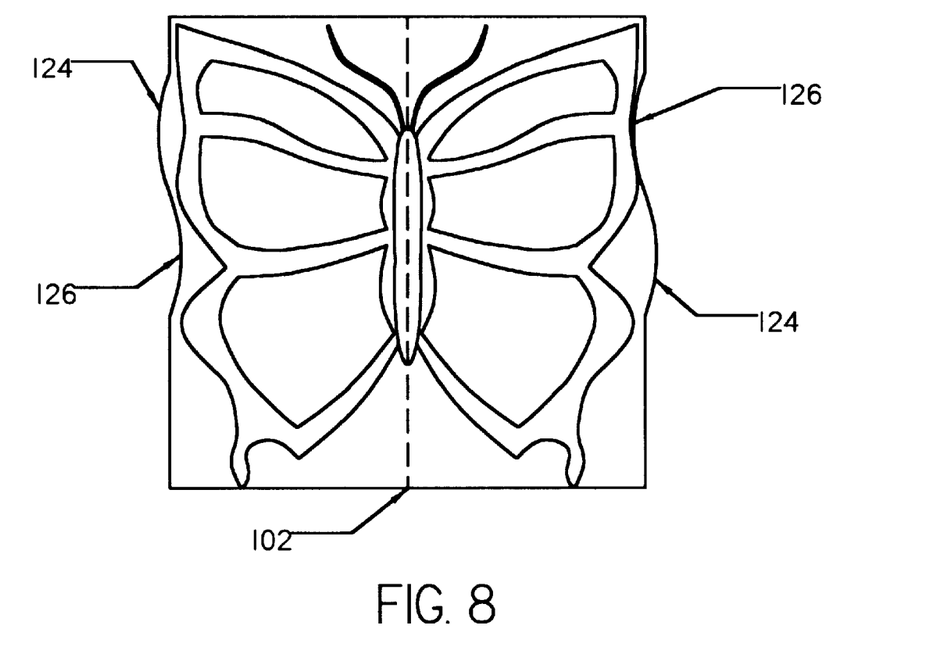
FIG. 8 shows a first alternative embodiment of the invention, fully opened, illustrating the finger tabs.
Figure 9:
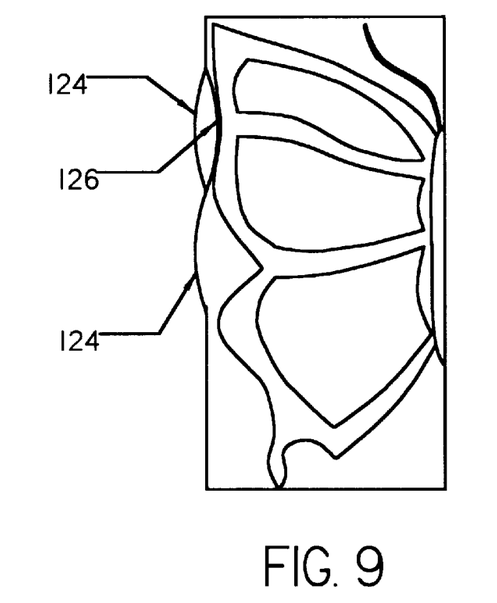
FIG. 9 shows the first alternative embodiment in its folded position illustrating the overlapping nature of the finger tabs.

FIGS. 8 and 9 illustrate an alternative embodiment in which finger tabs, 124, and insets, 126, have been formed in opposite edges of the trap. When folded, as shown in FIG. 9, the tab from one side aligns with the inset on the other side. This provides a convenient location for grasping the two edges to pull the trap open. The layout of the tabs and insets is such that traps can be laid out contiguously on a sheet of material and cut with no wastage between the traps. This is also discussed below with reference to FIG. 12.

Figures 10, 11:
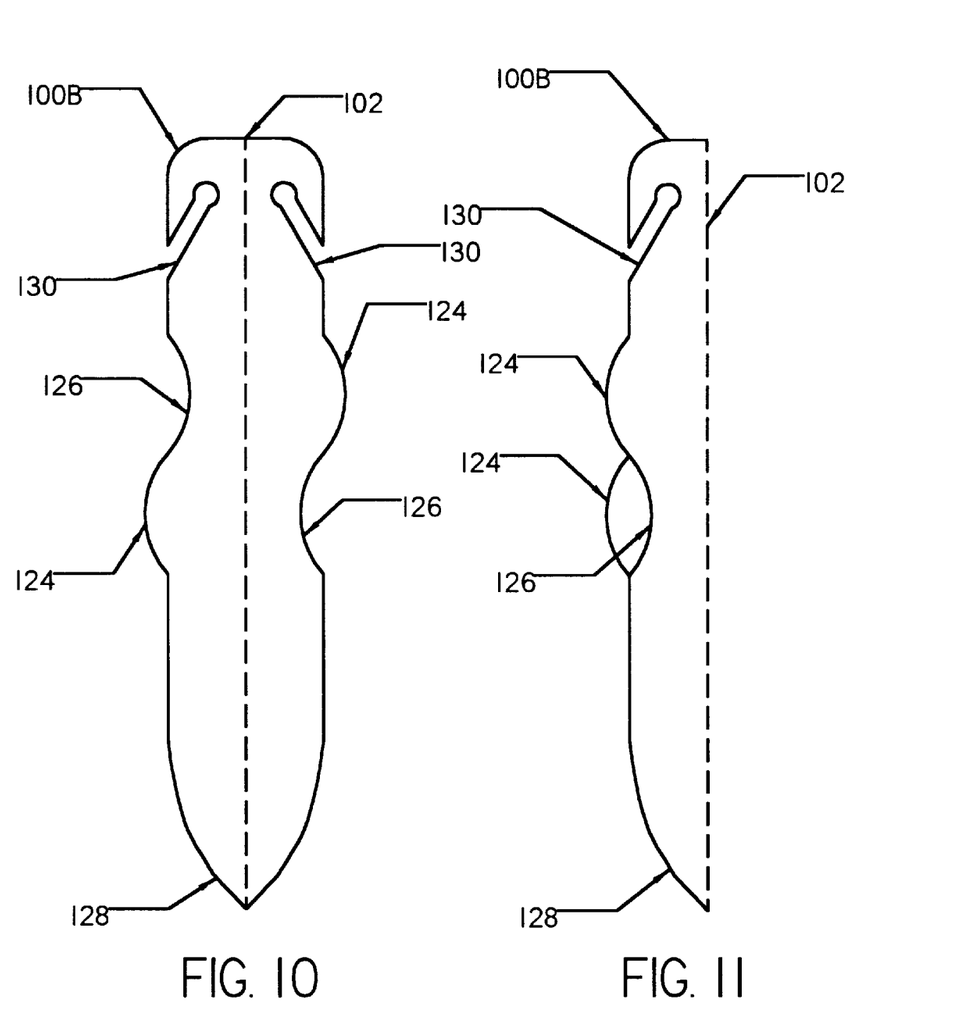
FIG. 10 illustrates a second alternative embodiment of the invention, fully open, which is adapted to inserting into soil.
FIG. 11 illustrates the second alternative embodiment, folded.

FIGS. 10 and 11 illustrate an alternative embodiment, 100B, of the trap in which it has been elongated along the vertical axis and pointed on one end, 128. This form is adapted to be inserted into the soil of a potted plant rather than used free-standing alongside the plant. Tabs, 124, and insets, 126, are optional and serve the same purpose as discussed above. Also illustrated is an alternative form of the V-notch, 130. Instead of being centered on the fold line, 102, the two slots are cut in from the outer edges. This form is functionally equivalent to notch, 112, discussed above, which can also be used with this form of the trap. As with the preferred embodiment, this form can be folded along the centerline, enclosing the adhesive layer within the trap.

Figure 12:
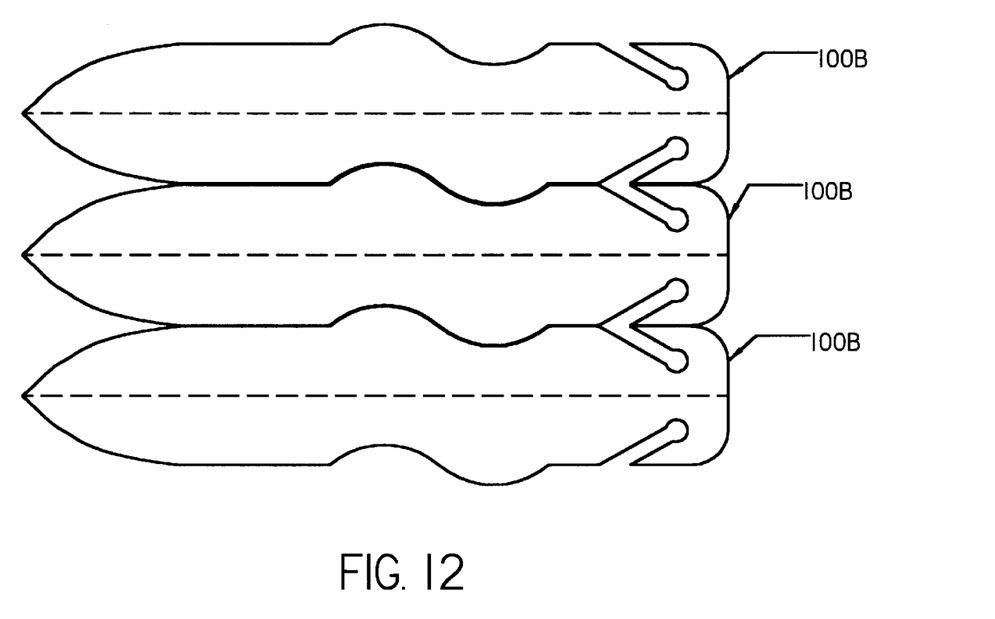
FIG. 12 illustrates a possible layout of the second embodiment for cutting.

FIG. 12 illustrates the relative alignment of several traps of the above alternative form as they could be laid out for cutting. Because of the offset layout of the tabs and insets, very little material is wasted. A similar layout can be used for the preferred embodiment as discussed above. Even less waste results from the rectangular shape of the preferred embodiment.

Figures 13, 14, 15, 16:
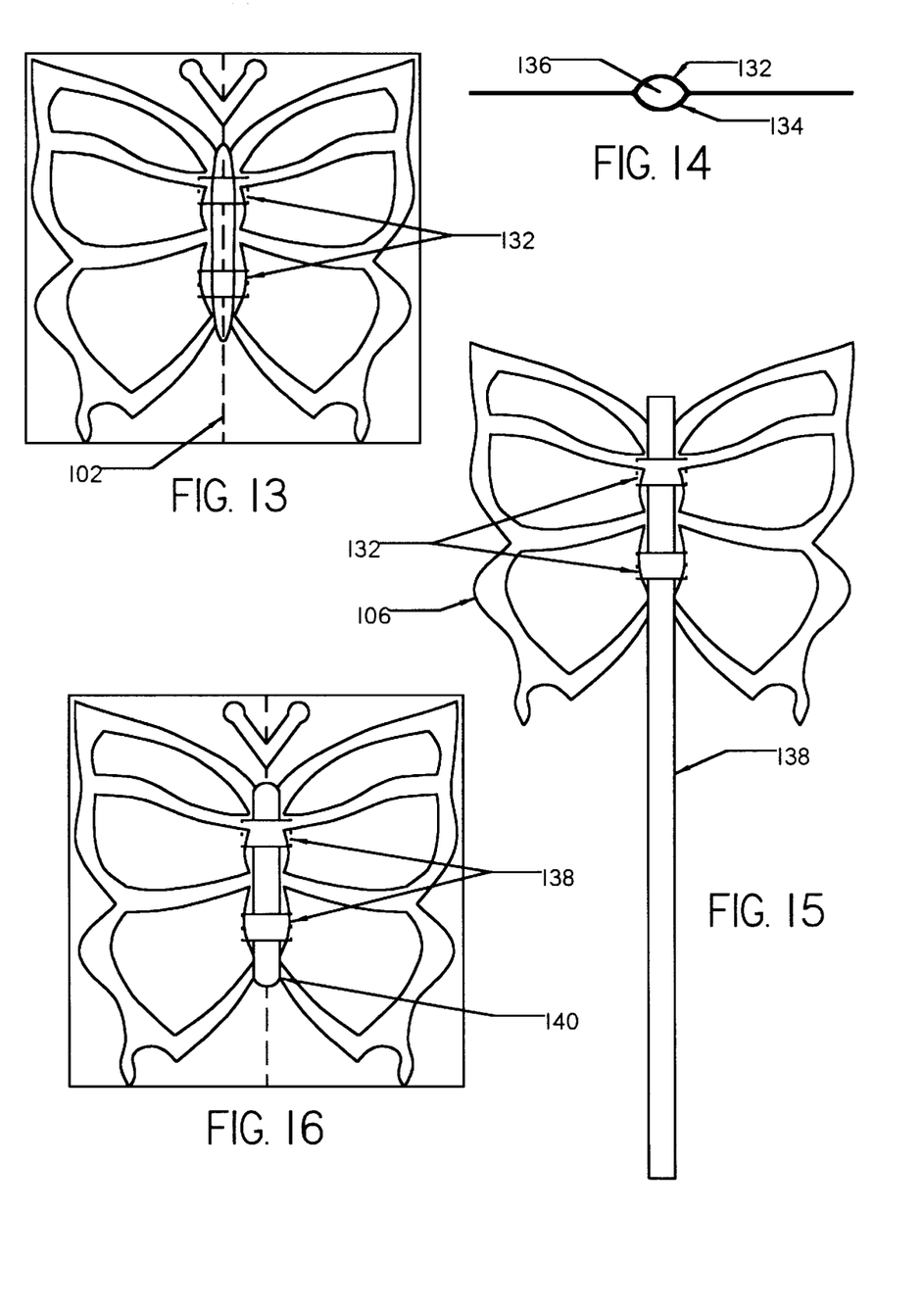
FIG. 13 illustrates an alternative form of the invention adapted to hold a cylindrical object along the central fold.
FIG. 14 provides an end view of the alternative form of FIG. 13.
FIG. 15 illustrates the alternative form of FIG. 13 used with a supporting stick for inserting into soil.
FIG. 16 illustrates the alternative form of FIG. 13 used with a chemiluminescense stick as a light source.

FIG. 13 illustrates an optional feature which can be added to the preferred embodiment. Straps, 132, are formed by cutting the base material essentially perpendicular to the centerline. As shown in the end view of FIG. 14, the straps, 132, can be moved in the opposite direction from the base material, 134, from which they were separated, to form a circular or elliptical opening, 136, along the centerline of the trap. The straps, and resulting opening, could also be position at other locations and alignments relative to the trap.

FIG. 15 illustrates the straps, 132, and resulting opening being used to attach the trap to a stick or rod, 138. This stick can then be inserted into the soil near a plant or otherwise attached. Attachment options include using adhesive, nails, or staples to attach the stick to a vertical surface such as a wall or the side of a pot; inserting the stick into clay, as might be used in flower arranging, or tying the stick to a stalk, limb, or stem of a plant. This configuration also enables the trap to be cut in a silhouette of the pattern, rather than being left rectangular. Adhesive or other mechanical means, such as staples, could also be used to attach the trap to the stick.

FIG. 16 illustrates the use of the straps, 132, to hold a luminescent capsule, 140. A common form of such a capsule is the Cyalume chemiluminescense light stick. CYALUME is a registered trademark of Cytec Technology Corp., exclusively licensed to Omniglow Corporation. Other forms of luminescent capsule could also be used. The addition of the luminescent capsule enhances the efficiency of the trap by providing an active light source to attract insects. It is well known that certain colors of light will attract various insects.

By selecting the appropriate light for the luminescent capsule it can either enhance the color scheme of the pattern, 106, or provide an additional color. This form of the trap is especially suited for outdoor activities such as camping or backpacking, where it is desirable to draw the insects away from the area that is in use, such as the tent, recreational vehicle, or picnic table, as well as to trap the insects. Utilizing the flexibility to either stand or hang the trap, it could be attached to a backpack, hung from a tree branch, or laid flat or placed upright on the ground, a table or rock. The size and output of the luminescent capsule can vary significantly. The smaller capsules would function as markers and to attract the insects, while larger ones can also serve as night lights and can provide sufficient light to enable tasks to be performed after dark. The duration of the luminescent capsules also varies, ranging from minutes to hours, depending on color, output level, and size of the capsule. Adhesive could also be used to attach the luminescent capsule to the trap.

While the preferred form of the invention has been disclosed above, alternative methods of practicing the invention are readily apparent to the skilled practitioner. The above description of the preferred embodiment is intended to be illustrative only and not to limit the scope of the invention.

What is claimed is:

1. A sanitary, aesthetically pleasing insect trap comprising:

(a) a vertically elongated sheet having a vertical fold, and a lower end formed to a point sufficient for insertion into loose potting soil, said sheet having an inner surface and an outer surface;

(b) an adhesive layer applied to said inner surface; and (c) a pattern imprinted on said outer surface.

2. The insect trap of claim 1 wherein said sheet has opposing vertical edges and each of said edges has a slot extending inwardly and upwardly at substantially equal angles, said slots adapted to simultaneously receive a horizontal rod when said sheet is folded.

* * * * *